(12) United States Patent (10) Patent No.: US 7,856,664 B2
De Gaetano (45) Date of Patent: Dec. 21, 2010

(54) METHOD, SYSTEM AND COMPUTER PROGRAM FOR A SECURE BACKUP LICENSE SERVER IN A LICENSE MANAGEMENT SYSTEM

(75) Inventor: Rosella De Gaetano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 11/557,218

(22) Filed: Nov. 7, 2006

(65) Prior Publication Data

US 2007/0118911 A1 May 24, 2007

(30) Foreign Application Priority Data

Nov. 22, 2005 (EP) .................................. 05111071

(51) Int. Cl.
*H04L 9/00* (2006.01)
*H04L 9/08* (2006.01)
*G06F 7/04* (2006.01)
*G06F 17/30* (2006.01)
*H04N 7/16* (2006.01)
*G06F 11/00* (2006.01)

(52) U.S. Cl. .............................. 726/30; 726/26; 726/27; 380/277; 380/278; 380/279; 380/286; 714/2; 714/6

(58) Field of Classification Search .................... 726/26, 726/27, 29, 30, 31; 380/277, 278, 279, 286; 714/1, 2, 6, 32
See application file for complete search history.

(56) References Cited

U.S. PATENT DOCUMENTS

| | | | | |
|---|---|---|---|---|
| 5,390,297 A | * | 2/1995 | Barber et al. ................... 726/29 |
| 6,574,612 B1 | * | 6/2003 | Baratti et al. ................... 705/59 |
| 6,728,896 B1 | * | 4/2004 | Forbes et al. ................... 714/4 |
| 6,757,836 B1 | * | 6/2004 | Kumar et al. ................... 714/4 |
| 6,785,678 B2 | * | 8/2004 | Price ............................... 707/8 |
| 6,842,896 B1 | * | 1/2005 | Redding et al. ............. 717/172 |
| 6,915,278 B1 | * | 7/2005 | Ferrante et al. ............... 705/59 |
| 7,020,695 B1 | * | 3/2006 | Kundu et al. ................. 709/223 |

(Continued)

FOREIGN PATENT DOCUMENTS

CN 1109416 A 10/1995

OTHER PUBLICATIONS

Citrix et al., "Citrix Access Suite Licensing Guide", 2005, Citrix Systems, Inc.*

*Primary Examiner*—Matthew B Smithers
*Assistant Examiner*—Hilary Branske
(74) *Attorney, Agent, or Firm*—Garg Law Firm, PLLC; Rakesh Garg; Jeffrey S. LaBaw

(57) ABSTRACT

A method and a corresponding apparatus for a high availability license management system. The system has a License Backup Server for ensuring uninterrupted service, while at the same time preventing any possible malicious use. According to the present invention, only two servers are required for realizing a secure system. The first server hosts a License Server A 303 and Agent C 305. License Server A 303 contains certificates for all available licenses. The second server hosts a Backup Server B 309 which contains the same licenses of License Server A. Agent C monitors the operation making sure that Backup Server B does not grant any license while License Server A is up and running.

20 Claims, 4 Drawing Sheets

U.S. PATENT DOCUMENTS 7,478,263 B1 * 1/2009 Kownacki et al. ............... 714/4
2003/0074596 A1 * 4/2003 Mashayekhi et al. ........... 714/4
2004/0044630 A1 3/2004 Walker et al.

* cited by examiner

METHOD, SYSTEM AND COMPUTER PROGRAM FOR A SECURE BACKUP LICENSE SERVER IN A LICENSE MANAGEMENT SYSTEM

TECHNICAL FIELD

The present invention relates to the data processing field. More specifically, the present invention relates to a metho method for a license management system. In particular the security of a backup system which avoids malicious use is addressed by the present invention. The invention further relates to a computer program for performing the method, and to a product embodying the program. Moreover, the invention also relates to a corresponding apparatus.

BACKGROUND ART

Licensing of computer software was traditionally accomplished by providing a copy of the software and a license for each computer which was authorized to use the software. The software could be generally used only on that computer, unless it was deleted from that computer and transferred to another one together with the license. With the advent of wide spread computer networks a more efficient solution was required. A license management system allows a user to install a copy of a software program on N nodes of a network, but acquire only a limited number n of licenses, where at any time only the maximum number n copies of that program can be simultaneously run on the network. When all the available licenses are allocated, additional users requesting the use of that software must wait for a license to become available. This kind of license management system has a number of advantages for both the software vendor and the user, because it allows the user to purchase all and only the licenses really needed and, on the other hand, allows the vendor to fight software piracy.

An example of a state of the art license management system available on the market, is the License Use Management product of International Business Machines Corp.

In a typical network of interconnected computers with a license management system, as illustrated in FIG. 1, one or more of the nodes 101 act as license servers, while a plurality of nodes 103 act as clients of the license servers. The service provided by a license server 101 to its client 103 is that of granting or denying permission to run a given software program, according to the availability of a license record in the license server data base, and to the terms and conditions encoded in the license record itself. The license server usually creates and stores license records in the license data base upon processing license certificate files, which are provided by the software vendor and complement the software program to which they are related. This license data base must be locked in some way to the specific instance of the license server (hardware+software) to prevent malicious users from copying the license data base to another license server machine and multiplying the number of licenses for all the software products contained in the license data base. License certificate files may contain some encryption or checksum information that allow the license server to verify their authenticity and integrity.

The fact that a license management system is controlling the use of a given software program should be as transparent as possible to the users of that software program whereas it should be evident and beneficial to the administrator of licenses for that and other software programs. This consideration places a strong requirement on the license management system in terms of reliability and performance. The ideal license management system should be one which never causes software program failures. A back up system must be provided, so that in case of failure of a license server, a backup server can ensure the uninterrupted continuity of the service.

In a license management system, "availability" is a measure of the degree to which the system can process and satisfy incoming requests (either granting or denying permission to run) within the time limits set by the served environment. High availability systems attempt to provide a continuous service within a particular operational window by minimising causes of failure and minimising recovery time when failures occur. Usually this requires a large degree of redundancy in system components, so that the continued operation of the entire system is protected from failure of any single component. The ultimate objective is to eliminate all single points of failure in the system. This can be accomplished by having redundant components or systems, and "availability management technology" that can automate the transfer of services to those redundant components when a failure occurs. Availability is a crucial feature of license management systems, since an outage of one or more license servers of a license management system can prevent many users from running their critical applications, due to a failure to acquire a license. An obvious solution to ensure good availability would be to use well known clustering techniques. In the network data processing field, a cluster is a set of independent processors (nodes), connected over the network. A cluster constitutes a sort of "black box" which provides certain services to end users. Like any ideal black box system, the end users do not need to know which node in the cluster they are connecting to. However, common clustering techniques, aimed at increasing the overall availability of the system through server redundancy, cannot be applied in a straightforward way to license management systems because of the secure nature of the license serving environment. A redundant license server cannot simply take over the amount of licenses, served by another failing server; it must also ensure that, in no circumstances, the total number of licenses concurrently served can exceed the total number of available (i.e. purchased) licenses.

Solutions to this problem, based on a method called "majority" or "quorum", are known, in which a certain number of license servers are configured to work cooperatively. As long as the majority of those servers is up and running and communicating with each other, all licenses are available, whereas as soon as the number of active license servers becomes less than the majority, all of the servers stop serving licenses.

The above mentioned IBM License Use Management product implents a similar "cluster" back up method, with additional security measure to allow a certain degree of flexibility, i.e. the possibility of adding a new server to the cluster while ensuring the security of the system. Such solution is very effective, however it requires the availabity of a high number of license servers (at least 3). In some cases this can be too expensive and complex, therefore a simplified method would be desirable.

It is an object of the present invention to provide a method and a system which alleviates the above drawbacks.

SUMMARY OF THE INVENTION

According to the present invention we provide a method of controlling use of software products in a system including a plurality of client workstations, the system including at least a first data processing unit hosting a main license server for granting use of a limited number of concurrent instances of at least one product, and a second data processing unit hosting a backup license server, the method including the steps of: enrolling a set of licenses for at least one product on the main license server and on the backup license server; preventing the backup license server to grant any license, while the main license server is active; monitoring the activity of the backup license server; responsive to a detected failure of the backup license server, suspending the activity of the main license server until activity of backup license server is restored.

A further aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
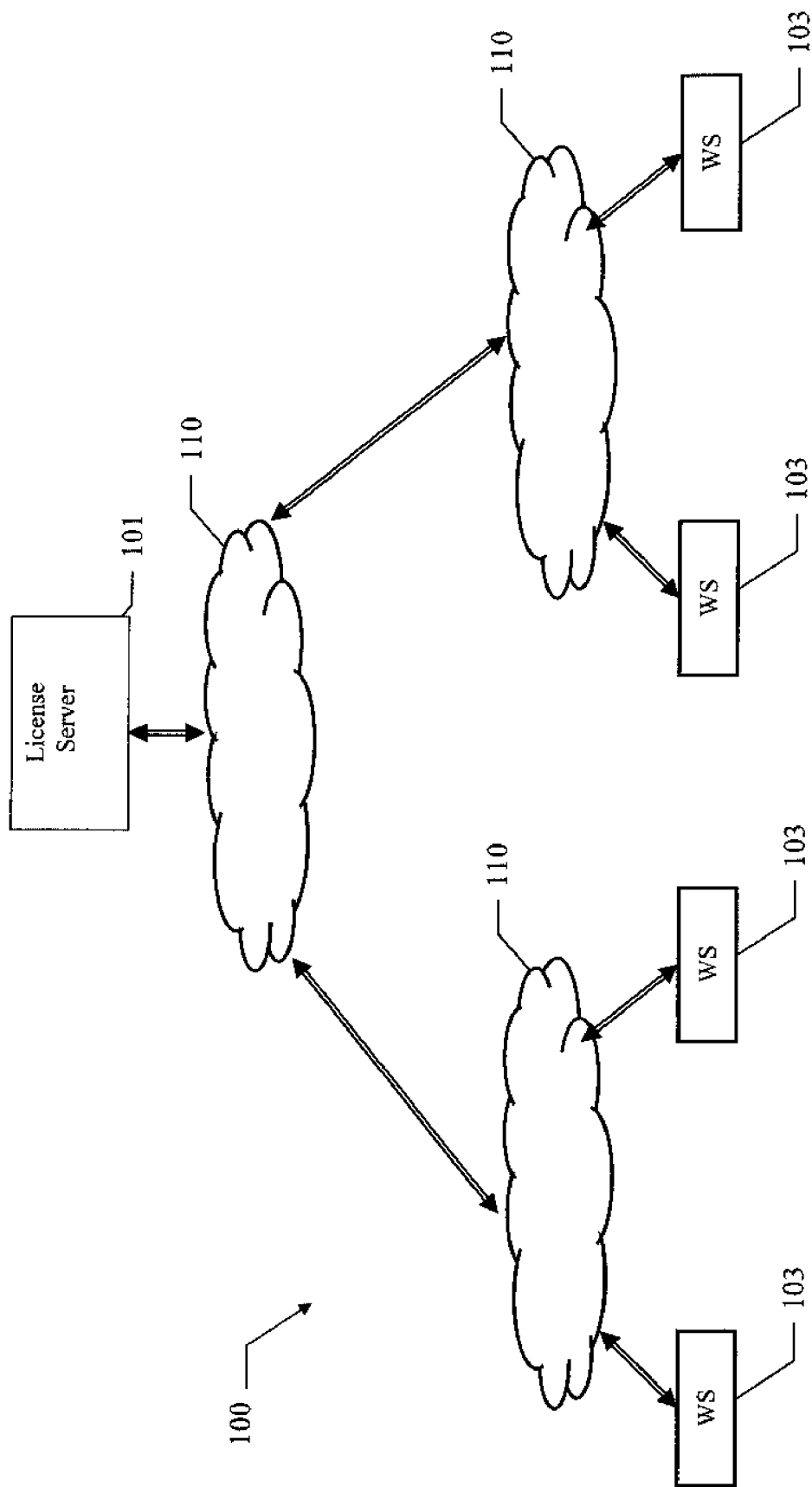
FIG. 1 is a schematic block diagram of a computer network in which the method of the invention is applicable.

As mentioned above, FIG. 1 represents a typical network of computers (100) using a license management system which could implement the present invention. Server 101 may be, for example a RISC server like IBM 7029-6E3 produced by International Business Machines Corp. running AIX 5.3 as operating system. Client nodes 103 could be any personal computer or workstation available on the market, e.g. a RISC client 7043-150 running AIX 5.3 or an IBM ThinkCenter running Windows XP. Server and client nodes 103 are connected through networks 110 (e.g. Local Area Network).

Figure 2:
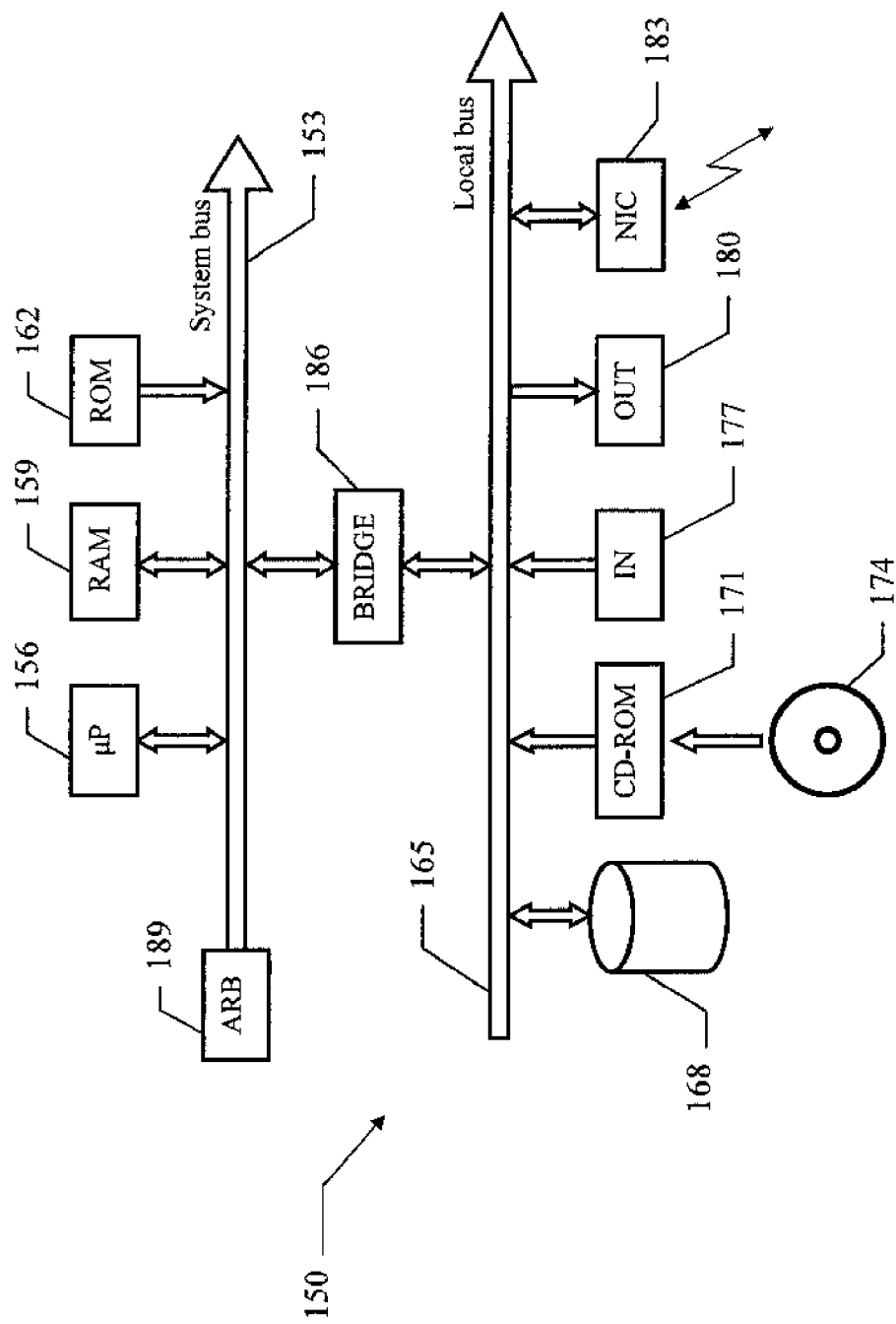
FIG. 2 shows the functional blocks of a generic computer of the system.

As shown in FIG. 2, a generic computer of the system (workstation or license server) is denoted with 150. The computer 150 is formed by several units that are connected in parallel to a system bus 153. In detail, one or more microprocessors (μp) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized.

Figure 3:
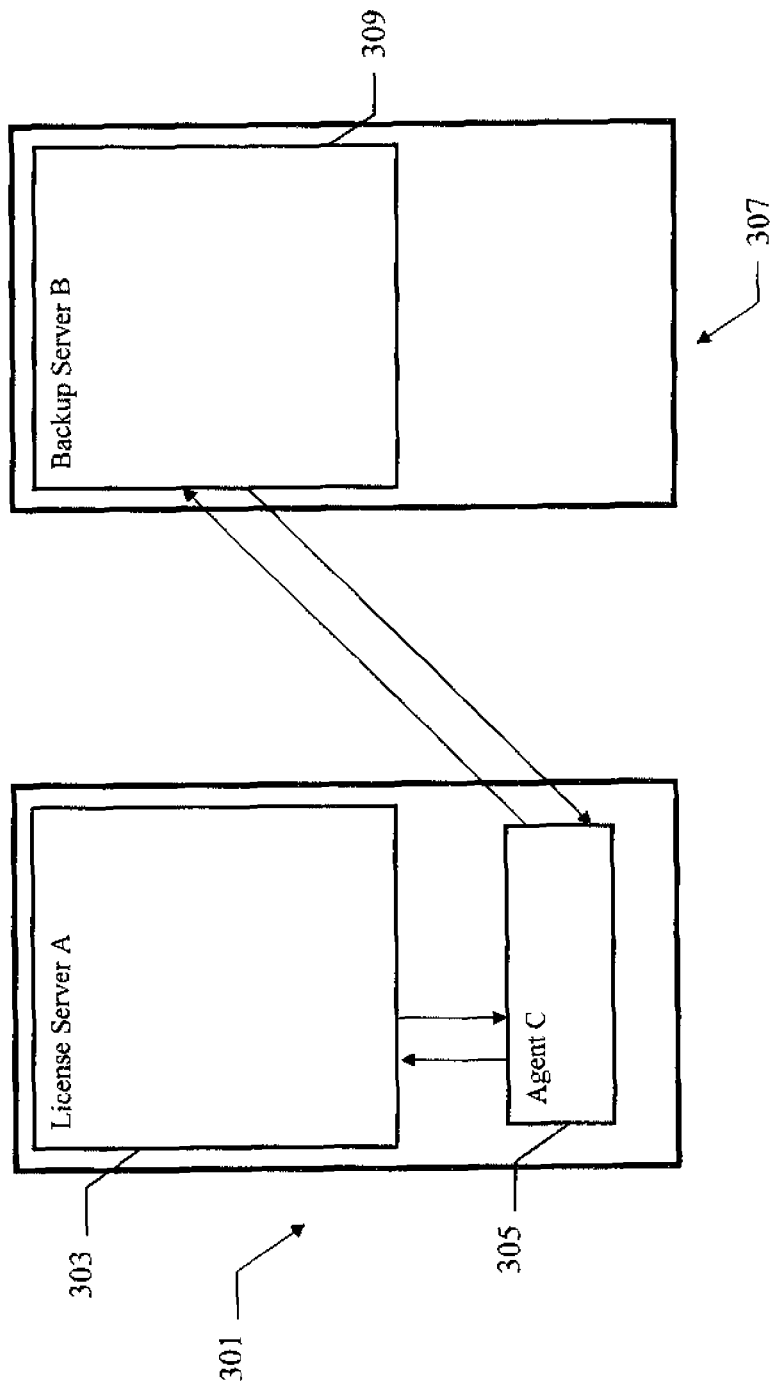
FIG. 3 depicts the main components that can be used for practicing the method.

Considering now FIG. 3, the main components that can be used to practice the method of a preferred embodiment of the invention are illustrated. The information (programs and data) is typically stored on the hard-disks of the different computers and loaded (at least partially) into the corresponding working memories when the programs are running.

According to a preferred embodiment of the present invention Server 301 hosts a License Server A 303 and Agent C 305. License Server A 303 contains a number of licenses corresponding to all purchased certificates. According to a preferred embodiment of the present invention a license server is a process which provides license services administering licenses for software products. It usually includes: a communication layer, used to connect with the license clients (that is the license-enabled applications); a license data base, that is the physical place where to store all meaningful information (it typically resides on the hard disk); a cache, that is the image in memory of the license data base (it is needed to speed up performances); a set of callbacks needed to satisfy the client/administrative requests; an encryption/decryption engine needed for security purposes. The internal logic of the license server has to support the license policies described into the license certificates.

A license is granted if and only if there is an available license on the license server that satisfies the license request. Once obtained a license, the client is in charge of maintaining it "in use", in other words to let the server know that the license is being exploited and it should not be assigned to another user. According to a preferred embodiment of the present invention this can be done by periodically communicate its own aliveness to the license server (heartbeat).

Server 307 hosts Backup License Server B 309, which contains a backup of all licenses of License Server A 303.

When License Server A starts, Agent C acts as a license client for Backup License Server B requesting all available licenses and keeping them "in use" (e.g. with a periodic heartbeat), thus preventing Backup License Server B to grant any license to a real application. In this way any fraudulent use of duplicated licenses hosted by Backup License Server B is prevented, while Server A is running. In case License Server A has a breakdown or an interruption for any reasons, Agent C "frees" all licenses of Backup License Server B which then become available for use. Another possible scenario is that Server A is still up and running, but Agent C isn't. In such case it is necessary that A "suspends" itself and keeps its licenses "in use", because it must be taken into account that the licenses on B will all be available, since B does not receive the heartbeat form C. It is important that Agent C resides on the same machine of License Server A, so that it is impossible to isolate License Server A (e.g. behind a Firewall) and duplicating the licenses while Backup License Server B is granting licenses.

During normal operations, i.e. when License Server A is running, Agent C monitors the correct operations of Backup Server B, so that any interruption of Server B is immediately detected. In such case, Agent C cannot determine whether the interruption is due to a problem of Sever B or to a malicious attempt of isolating the Server (e.g. behind a firewall) to duplicate the available licenses. Therefore Agent C suspends also the operation of Server A. In this way the administrator is forced to restart (or reconnect) Server B, otherwise the licenses of Server A will remain unavailable. It is to be noted that the present method requires backup Server B to be always up and running. No failure of Server B is allowed; this can be a reason of discontinuity of the service, however it is considered that the failure of a backup Server is relatively unlikely.

According to the embodiment described above License Server A and Agent C are two separate processes. However the method of the present invention could be implemented with a single process providing the functions of both License Server A and Agent C. E.g. Agent C could be just a thread or a task of License Server A. The important feature is that while A is correctly running Backup Server B is prevented from granting licenses, while, when a failure of B is detected License Server A "self suspends" itself.

Figure 4:
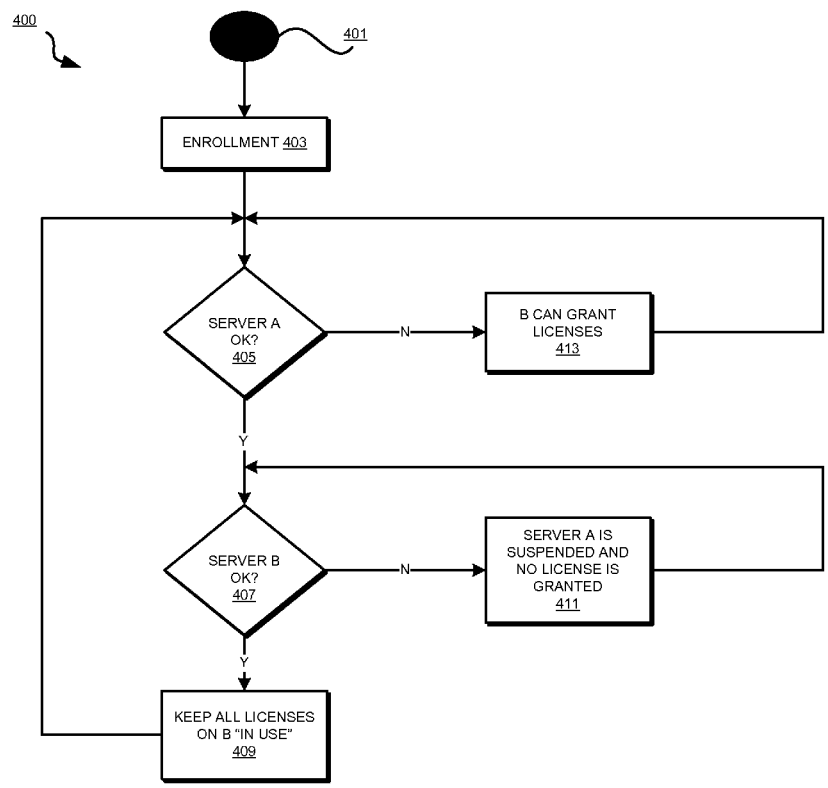
FIGS. 4 show a diagram describing the flow of activities relating to an illustrative implementation of the method.

Considering now FIG. 4, the logic flow of a license manager process with a secure backup according to an embodiment of the invention is represented with a method 400. The method begins at the black start circle 401. At step 403, the licenses are enrolled in the main license server (License Server A) and in the backup license server (Backup Server B). Continuing to block 405 it is checked that License Server A is up and running. According to a preferred embodiment of the present invention this check is performed by Agent C, but this could be performed e.g. by Server A itself. If the result of the check is positive the control goes to step 407 where Backup Server B is monitored to verify it is up and running. In such case all licenses available on on Backup Server B are requested (e.g. by Agent C) so that such licenses cannot be used by a real application (step 409). According to a preferred embodiment of the present invention, Agent C then periodically sends a "heartbeat" to Backup Server B, as if it were a real license-enabled application, forcing Backup Server B to keep the license "in use", i.e. not available for any other applications. On the other hand, when a failure of Backup Server B is detected it is impossible to determine if this is due to a real failure or to an attempt of malicious use, therefore License Server A is suspended, thus preventing any licenses to be granted by License Server A (step 411) until Backup Server B is restored. Going back to the check step 405, when the result is negative, Agent C stops sending the "heartbeat" to Backup Server B. Of course when Backup Server B does not receive any "heartbeat" it is assumed that the Agent C or the License Server A are not properly working so it frees up the licenses kept in use by Agent C making them available to other clients (step 413). According to a preferred embodiment of the present invention, License Server A is also in charge of controlling the aliveness of the software agent C. In case C has not been started at all, A is in charge to make it start. After starting C, A checks periodically C aliveness via a hearbeat or ping-like mechanism (since they reside on the same machine they can use for example IPC protocol to communicate). This two tasks can be started as soon as A starts or as soon as the first license is enrolled (i.e. registered on the license data base). As soon as the license is enrolled License Server A is also in charge of sharing with C all relevant information about that license (for example vendor identifiers, product identifiers, license identifiers) in order to make C able to request a license from Backup Server B. License data base and cache on Backup Server B can be populated at enrollment time in two ways: either the enrollment tool contemporarily enroll the license on both License Server A and Backup Server B; or License Server A sends the license information to Backup Server B.

For security purposes the licenses must be tighten to both License Server A and Backup Server B unique identifiers and Servers A and B are in charge to check if the unique identifiers inserted into the license certificates match their own. Then Agent C requests to Backup Server B the whole license amount stored in the enrolled licenses. As described above, Backup Server B marks all licenses as "in use" so that no license enabled application can use them. In case of failure of License Server A, Agent C does not receive the heartbeat anymore and so stops sending its own heartbeat to B. B then releases the "in use" licenses which become then available to license-enabled applications. The license-enabled application can then request licenses from Backup Server B. As soon as License Server A recovers, it restarts sending the heartbeat to Agent C which then forces Backup Server B to release the licenses granted to the license-enabled application and keep them "in use" for C. The enabled application should then request again a license. This time it will be granted by License Server A. This mechanism of switching between A and B in requesting the license should be inside the license-enabled application and can be transparent to the end user.

In case of failure of Agent C, License Server A is no longer able to successfully send its heartbeat, so it suspects a security exposure and deny/revoke its own licenses to the license-enabled application. In fact B cannot receive C's heartbeat and so it is able to serve licenses.

Similar considerations apply if the programs and data are structured in a different manner, if other modules or functions are provided, or if the information is stored in equivalent memory structures.

Similar considerations apply if the method includes equivalent or additional steps.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention. E.g. as already mentioned it is possible that License Server A and Agent C are a single process, even if according to the preferred embodiment described above they are different processes, running on the same data processing unit.

In any case, the method of the invention can be used for controlling use of any kind of software products (such as video games, multimedia works, and the like).

In addition, the programs can be distributed on any other computer readable medium (such as one or more DVDs); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of controlling use of software products in a system including a plurality of client data processing units, the system including at least a first server data processing unit, hosting a main license server for granting use of a limited number of concurrent instances of at least one product, and a second server data processing unit hosting a backup license server, the method including the steps of:

enrolling a set of licenses for at least one product on the main license server and on the backup license server such that each of the main license server and the backup license server can grant any license from the set of licenses;

preventing the backup license server to grant any license while the main license server is active, the preventing including indicating the set of licenses on the backup license server as being in use at the backup license server;

monitoring the activity of the backup license server;

responsive to a detected failure of the backup license server, suspending the activity of the main license server until activity of backup license server is restored; and responsive to a detected failure of the main license server, granting a license in the set of licenses from the backup license server, the granting occurring after freeing the license by the backup license server.

2. The method of claim 1 wherein the steps of enrolling includes registering license information for each at least one product, the license information including the maximum number of concurrent instances of the product which are allowed to run on the system.

3. The method of claim 1, wherein the steps of preventing, monitoring and suspending is performed by the main license server.

4. The method of claim 1 wherein the steps of preventing, monitoring and suspending is performed by a controlling agent being hosted on the first server data processing unit.

5. The method of claim 4, wherein the step of preventing includes the steps of:

the controlling agent requesting all available licenses to backup license server; and the controlling agent sending a periodic heartbeat to backup license server so that backup license server keeps all the available licenses reserved for controlling agent.

6. The method of claim 5 including the steps of:

the controlling agent monitoring the activity of main license server; and responsive to a detected failure of the main license server, the controlling agent suspending the periodic heartbeat to backup license server, so that backup license server can grant the licenses according to registered license information, until activity of the main license server is recovered.

7. The method of claim 4 including the steps of:

the main license server monitoring the activity of controlling agent; and responsive to a detected failure of the controlling agent the main license server suspends its granting activity.

8. A computer program product in a computer readable non-transitory storage medium for performing a method for controlling use of software products in a system including a plurality of client data processing units, the system including at least a first server data processing unit, hosting a main license server for granting use of a limited number of concurrent instances of at least one product, and a second server data processing unit hosting a backup license server, when the computer program is executed on a data processing system; the method comprising the steps of:

enrolling a set of licenses for at least one product on the main license server and on the backup license server such that each of the main license server and the backup license server can grant any license from the set of licenses;

preventing the backup license server to grant any license while the main license server is active, the preventing including indicating the set of licenses on the backup license server as being in use at the backup license server;

monitoring the activity of the backup license server;

responsive to a detected failure of the backup license server, suspending the activity of the main license server until activity of backup license server is restored; and responsive to a detected failure of the main license server, granting a license in the set of licenses from the backup license server, the granting occurring after freeing the license by the backup license server.

9. The product including the program of claim 8 wherein the enrolling includes registering license information for each at least one product, the license information including the maximum number of concurrent instances of the product which are allowed to run on the system.

10. A system for controlling use of software products in a system including a plurality of client data processing units, comprising:

at least a first server data processing unit, hosting a main license server for granting use of a limited number of concurrent instances of at least one product;

a second server data processing unit hosting a backup license server;

computer usable code for enrolling a set of licenses for at least one product on the main license server and on the backup license server such that each of the main license server and the backup license server can grant any license from the set of licenses;

computer usable code for preventing the backup license server to grant any license while the main license server is active, the preventing including indicating the set of licenses on the backup license server as being in use at the backup license server;

computer usable code for monitoring the activity of the backup license server;

computer usable code for responsive to a detected failure of the backup license server for suspending the activity of the main license server until activity of backup license server is restored; and computer usable code for, responsive to a detected failure of the main license server, granting a license in the set of licenses from the backup license server, the granting occurring after freeing the license by the backup license server.

11. The computer program product of claim 8, wherein the steps of preventing, monitoring and suspending is performed by the main license server.

12. The computer program product of claim 8, wherein the steps of preventing, monitoring and suspending is performed by a controlling agent being hosted on the first server data processing unit.

13. The computer program product of claim 12, wherein the step of preventing includes the steps of:

the controlling agent requesting all available licenses to backup license server; and the controlling agent sending a periodic heartbeat to backup license server so that backup license server keeps all the available licenses reserved for controlling agent.

14. The computer program product of claim 13 including the steps of:

the controlling agent monitoring the activity of main license server; and responsive to a detected failure of the main license server, the controlling agent suspending the periodic heartbeat to backup license server, so that backup license server can grant the licenses according to registered license information, until activity of the main license server is recovered.

15. The computer program product of claim 12 including the steps of:

the main license server monitoring the activity of controlling agent; and responsive to a detected failure of the controlling agent the main license server suspends its granting activity.

16. The system of claim 10 wherein the enrolling includes registering license information for each at least one product, the license information including the maximum number of concurrent instances of the product which are allowed to run on the system.

17. The system of claim 10, wherein the computer usable code for preventing, monitoring and suspending is executed by the main license server.

18. The system of claim 10, wherein the computer usable code for preventing, monitoring and suspending is executed by a controlling agent being hosted on the first server data processing unit.

19. The system of claim 18, wherein the computer usable code for preventing includes:

computer usable code for the controlling agent requesting all available licenses to backup license server; and computer usable code for the controlling agent sending a periodic heartbeat to backup license server so that backup license server keeps all the available licenses reserved for controlling agent.

20. The system of claim 19 including:

computer usable code for the controlling agent monitoring the activity of main license server; and computer usable code for, responsive to a detected failure of the main license server, the controlling agent suspending the periodic heartbeat to backup license server, so that backup license server can grant the licenses according to registered license information, until activity of the main license server is recovered.

* * * * *